B. GUE.
Churn.
No. 208,169. Patented Sept. 17, 1878.
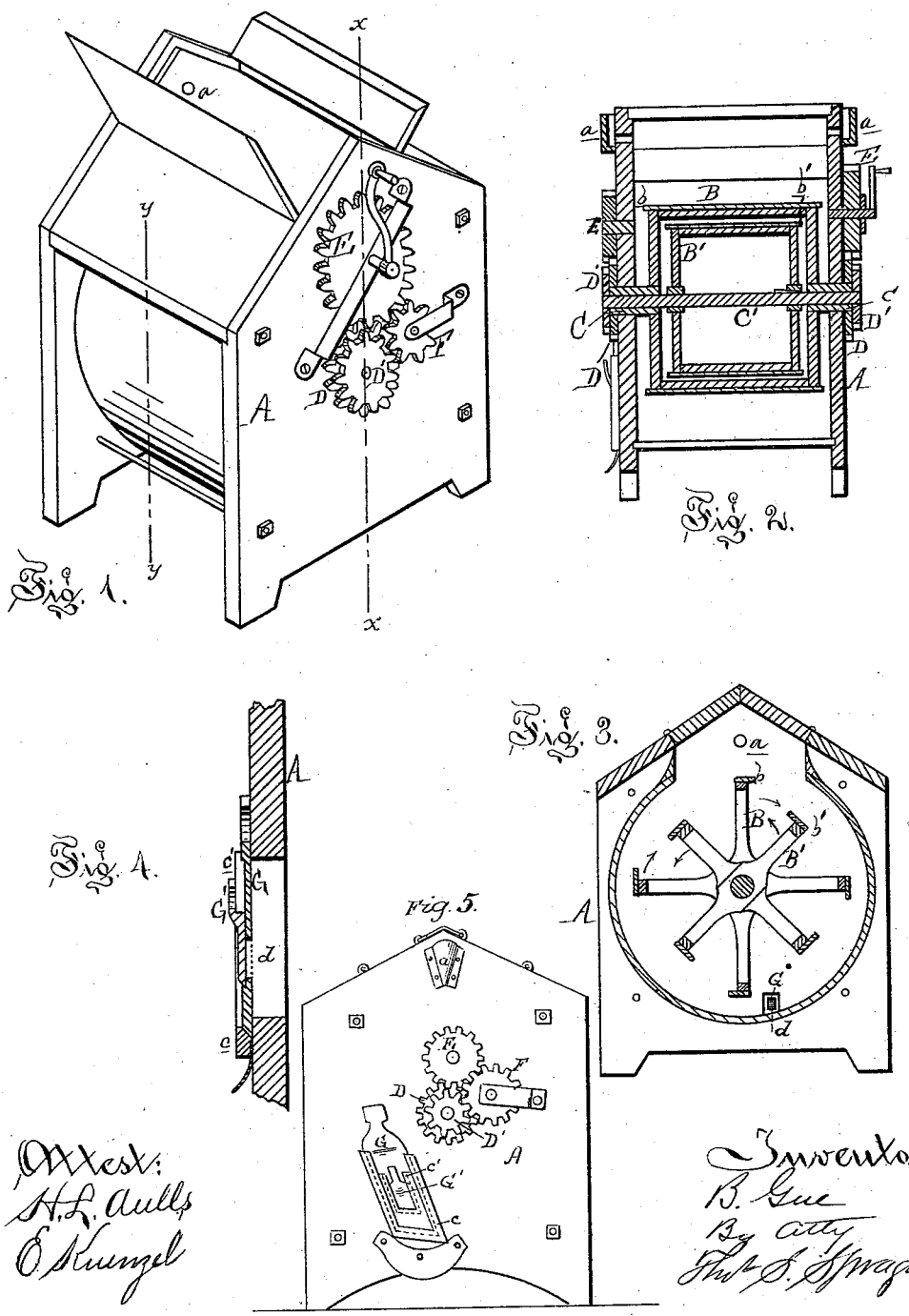

UNITED STATES PATENT OFFICE.

BENJAMIN GUE, OF NEW BALTIMORE, MICHIGAN.

IMPROVEMENT IN CHURNS.

Specification forming part of Letters Patent No. 208,169, dated September 17, 1878; application filed February 7, 1878.

*To all whom it may concern:*

Be it known that I, BENJAMIN GUE, of New Baltimore, in the county of Macomb and State of Michigan, have invented an Improvement in Churns, of which the following is a specification:

The nature of my invention relates to an improvement in barrel-churns of that class wherein two dashes are rotated in opposite directions; and its object is to rotate the same with a single crank.

The invention consists, first, in the peculiar construction of the dashes and their operating gear; and, secondly, in a peculiar double gate, for withdrawing separately the milk and the butter after churning.

Figure 1 is a perspective view. Fig. 2 is a longitudinal vertical section. Fig. 3 is a cross-section. Fig. 4 is a longitudinal section of the double gate at $x\ x$. Fig. 5 is an end elevation of the churn.

In the drawing, A represents the churn-body, provided with air-vents $a$ at the top sides, and hinged covers at the top.

B is the outer paddle-dasher, having a flange, $b$, on one edge of each float, the crossed arms at each end being mounted on a hollow shaft, C, journaled through the contiguous side of the churn-body.

C' is the inner dasher, having a flange, $b'$, on the edge of each float, which projects in the direction opposite those of the floats B. This dasher is mounted on a shaft, C', which passes through the hollow shafts C C, which latter have each a pinion, D, on their projecting ends, outside of which a pinion, D', is keyed on the end of the shaft C'.

A spur-gear, E, on the end of the body, meshes with and gives motion to each pinion, D, and also with an intermediate pinion, F, (it being thick enough to mesh with both on the different planes,) which pinion F meshes with the pinion D', and thus rotates the dashes in opposite directions, one of the gears, E, being provided with a crank for that purpose.

Rotating in the direction of the arrow the outer dasher takes up the milk with its flanges $b$, falling from which it is caught by the flanges $b'$ on the floats of the inner dasher and rapidly broken up to liberate the fatty globules, thus rendering the churning process easy and expeditious.

In one end there is a large opening, extending to the bottom of the churn, which opening is surrounded on three sides by flanges $c$, in which is a draw-gate, G, which in turn has a smaller opening, provided with external flanges, $c'$, into which is fitted a draw-gate, G'. The opening in the gate G is furnished with a screen, $d$, on the inside, which retains the particles of butter when said gate is opened to draw off the buttermilk, after which the larger gate is drawn to permit the removal of the butter from the churn.

What I claim as my invention is—

1. In a rotary churn, the combination of the dashes B B' with the hollow shafts C, each having a cog-wheel, D, on its outer end, the shaft C', provided with a cog-wheel, D', on each end outside of the cog-wheel D, the cog-wheels F, one on each side of the churn, meshing with the outer cogs, D', and the cog-wheels E, on each end of the machine, meshing with the cogs D F, one of which wheels, E, is provided with a hand-crank, constructed and arranged substantially as described and shown.

2. The gates G G' and their slides $c\ c'$, in combination with the body of a churn, as and for the purpose set forth.

BENJAMIN GUE.

Witnesses:
 H. F. EBERTS,
 H. S. SPRAGUE.